July 9, 1940.                I. A. SMITH                2,207,417
                             CEREAL BOWL
                          Filed April 18, 1938
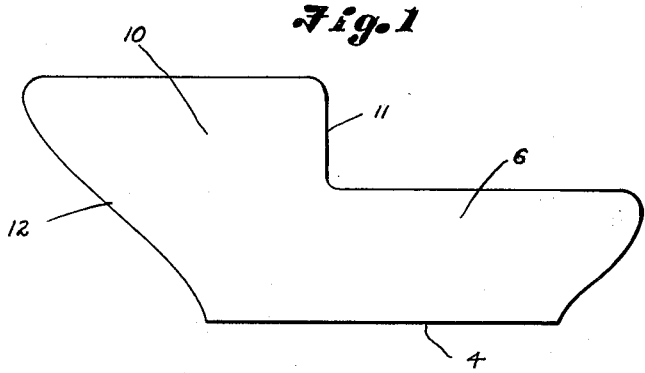
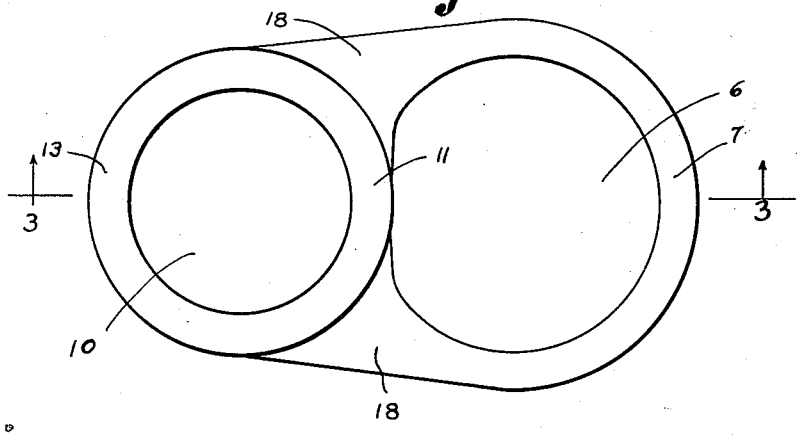
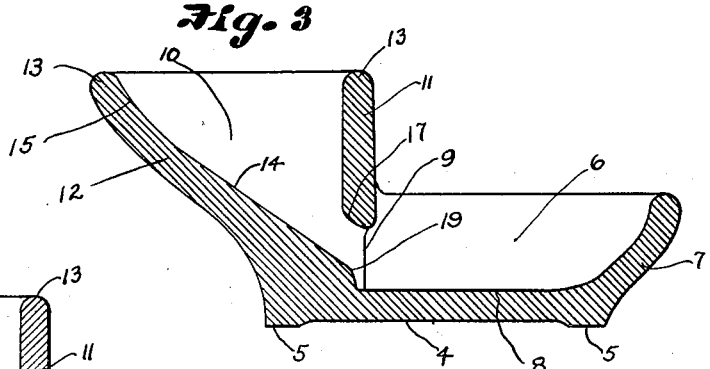
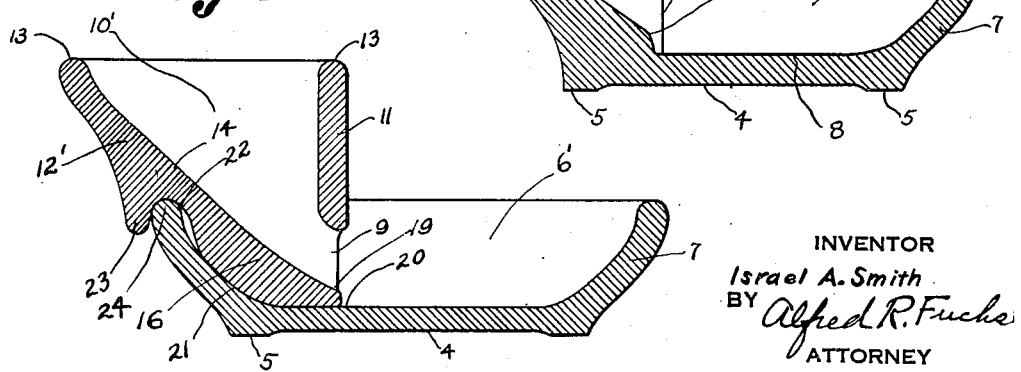
INVENTOR
Israel A. Smith
BY Alfred R. Fuchs
ATTORNEY Patented July 9, 1940

2,207,417

UNITED STATES PATENT OFFICE 2,207,417

CEREAL BOWL

Israel A. Smith, Independence, Mo.

Application April 18, 1938, Serial No. 202,713

5 Claims. (Cl. 65—15)

My invention relates to cereal bowls, and more particularly to a hopper feed cereal bowl.

It is a purpose of my invention to provide a cereal bowl that comprises a liquid receiving bowl portion and a cereal receiving hopper portion, that are so relatively arranged and located that any dry, loose cereal that may be placed in the hopper portion will be fed into the liquid retaining portion by gravity as the cereal is eaten from the liquid receiving portion of the device, or otherwise moved away from the discharge opening of the hopper. Cereals that are precooked, or otherwise prepared for eating in a dry state, are usually in the form of granules, flakes or other particles, that are readily fed by gravity from a hopper. Such cereals are more palatable and are also more readily digested, if the same are not soaked in the liquid before being eaten. By retaining the crispness of the particles to as great an extent as possible, the cereal has to be chewed more thoroughly than if it is allowed to absorb a large part of the liquid, such as milk or cream, with which it is usually eaten, the chewing, of course, aiding in the digestion of the cereal.

It is an important purpose of my invention to provide a dish that is so made that the liquid, such as cream or milk, can be placed in a bowl portion provided therefor, and the dry, loose cereal in a hopper portion provided for the cereal, and fed from said hopper portion gradually into the liquid holding portion of the dish, so that, as cereal and liquid are removed with a spoon from the bowl portion, the dry cereal will be fed into the liquid receiving bowl portion to replace the cereal so removed. Thus the cereal from the hopper will only be in the liquid in the bowl portion a short period of time.

It is also a purpose of my invention to provide a cereal dish of the above mentioned character, which, due to the movement of the cereal into the liquid receiving portion, will interest a child eating cereal, in the operation of eating the same, to an extent that would not otherwise exist in children who do not particularly care to eat cereals of this character, thus aiding in feeding such children cereal by arousing their interest in the process of eating the same.

My improved dish can be made with a hopper portion integral with the liquid receiving portion, or with the hopper portion detachable from the liquid receiving portion. It is an important purpose of my invention to so arrange and construct the bowl and hopper portions, that the same can be readily cleaned and kept sanitary, and, preferably, the hopper portion is spaced laterally from the liquid receiving portion, so that the cereal will enter one side of the liquid receiving bowl from the hopper. The exit from the hopper, or discharge opening, is, preferably, spaced above the bottom of the liquid retaining portion to such an extent that, with the usual amount of cream or milk eaten with cereal of this character, there will be little, if any, liquid entering the hopper portion.

Other objects and advantages of my invention will appear as the description of the drawing proceeds. I desire to have it understood, however, that I do not intend to limit myself to the particular details shown or described, except as defined in the claims.

In the drawing:

Fig. 1 is a view in side elevation of one form of my improved cereal bowl.

Fig. 2 is a top plan view thereof.

Fig. 3 is a vertical sectional view through the same, taken substantially on the line 3—3 of Fig. 2, and Fig. 4 is a section similar to Fig. 3, of a modified form of the invention.

Referring in detail to the drawing, my improved cereal bowl comprises a body portion having a bottom 4, which may be flat, or substantially so, and may be provided with a slightly projecting rim portion 5, as is customary in bowls or dishes of this character. A bowl portion 6, from which the cereal is to be eaten, is provided, and has an upwardly curving outwardly flaring side wall 7. Said bowl portion is shown as being substantially circular in character, but, of course, can be varied in shape as desired. The bottom 8 of said bowl portion is depressed below an opening 9, provided in one wall of the bowl portion for a purpose to be described below.

Extending upwardly from one side of the bowl portion is a hopper portion 10, which has a wall 11 extending substantially vertically from the bowl portion 6, so as to form a partition between the bowl portion 6 and the hopper portion. The wall portion 11 is curved, being shown as being curved substantially on the surface of a cylinder in the drawing, and merging with an inclined wall 12, the circular rim or lip 13 extending around the top of the hopper portion 12 and the vertical wall portion 11. The inclined wall portion 12 has an inner inclined face 14, having a portion that approaches straightness, between the top and bottom ends thereof, and is concavely curved at 15 near the top end thereof. The bottom edge of the wall 11 adjacent the opening 9 is convexly curved at 17, so as to offer no resistance to the flow of cereal toward the opening 9. The width of the bottom 4 is, of course, such that there will be no tendency for the dish to tip on the side thereof that is provided with the hopper 10. The hopper portion 10 and bowl portion 6 may be joined in any desired manner, as by means of the web portions 18, so as to provide a dish of smooth contour and without any difficult-to-clean recesses therein.

It will be obvious that, if liquid, such as milk or cream, is placed in the portion 6 of the dish, and dry, loose cereal in the hopper portion 10, the dry, loose cereal will flow from the discharge opening 9 from the hopper into the bowl portion 6, and thus accumulate in a pile near the opening 9 in the liquid in the bowl portion 6. While ordinarily a person would not place any more liquid in the bowl than would reach to the bottom edge 19 of the opening 9, yet if more liquid should be added after cereal has flowed into the bowl portion from the hopper portion, the cereal itself will prevent the liquid from entering the bottom portion of the hopper to any material extent, as dry cereal will continue to flow into the bowl portion as rapidly as it is removed with the spoon. The preferable way of using the bowl is to fill the hopper portion with dry cereal to the extent desired, and then add milk or cream, as desired, in the bowl portion 6.

If desired, the hopper portion can be made separable from the bowl portion to facilitate cleaning of the dish, the bowl portion 6', shown in Fig. 4, being of this character, and having a bottom 4, as previously described, and a concave side wall portion 7, the bowl portion 6' being made substantially in the form of an ordinary circular cereal bowl, such as is commonly used. The hopper portion 10' is detachable from the bowl portion 6' and has a substantially vertical wall portion 11 that merges with the inclined wall 12' in a similar manner to that described in connection with the form of the invention shown in Figs. 1 to 3, inclusive. The wall 12' inclines downwardly in a similar manner to the wall 12, to the discharge opening 9' of the hopper, which is located slightly above the bottom 20 of the bowl portion 6'.

The outer surface of the inclined wall 12' is, preferably, provided with a convex portion 21, that conforms substantially to the curvature of the inner face of the curved side wall 7 of the bowl 6', and has a hook-like formation comprising a concave recess 22 and a projection 23 for engaging over the rim portion 24 of the bowl 6', to detachably mount the hopper portion 10' on the bowl portion 6'. The operation of the device in the form shown in Fig. 4 is substantially the same as described in connection with the form shown in Figs. 1 to 3, inclusive.

What I claim is:

1. In a cereal dish, a wide shallow bowl and a cereal hopper taller than said bowl extending into said bowl, said hopper being located at one side of said bowl and having a steeply inclined bottom wall the lower end of which is disposed adjacent the bottom of said bowl, and a substantially vertical wall separating said hopper from said bowl closed except for an outlet at its lower end adjacent the bottom of said bowl disposed to feed cereal by gravity from the lower end of said inclined bottom wall into said bowl near the bottom thereof.

2. In a cereal dish, a bowl and a cereal hopper extending into said bowl a substantial distance, said hopper having the bottom end thereof disposed adjacent the bottom of said bowl and having an outlet disposed adjacent its bottom end to feed cereal by gravity into said bowl, said hopper having means thereon detachably engaging the rim of said bowl to hold the same in operative position.

3. In a cereal dish, a bowl and a cereal hopper extending into said bowl, said hopper having an inclined bottom wall the lower end of which is disposed above but near the bottom of said bowl, said hopper having an outlet disposed to feed cereal from the lower end of said inclined bottom wall into said bowl near the bottom thereof, said hopper having a rib and groove formation thereon detachably engaging the rim of said bowl to hold the same in operative position.

4. In a cereal dish, a bowl and a cereal hopper extending into said bowl, said hopper having an inclined bottom wall the lower end of which is disposed above but near the bottom of said bowl, said hopper having an outlet disposed to feed cereal from the lower end of said inclined bottom wall into said bowl near the bottom thereof, said hopper having a rib and groove formation thereon detachably engaging the rim of said bowl to hold the same in operative position, the lower end of said hopper engaging the bottom of said bowl.

5. In a cereal dish, a wide shallow liquid receiving bowl having substantially flat bottom, and a cereal hopper taller than said bowl mounted at one side of said bowl and extending into said bowl, said hopper having an upright wall separating said bowl from said hopper, said hopper having a discharge opening below the bottom edge of said wall disposed adjacent the bottom of said bowl but spaced slightly above said bottom, said hopper having a side wall portion extending from near the top thereof downwardly, in converging relation to said upright wall, to said discharge opening at such an inclination as to feed cereal by gravity from said hopper through said opening onto the bottom of said bowl.

ISRAEL A. SMITH.